Dec. 4, 1923.
R. C. BAXTER ET AL
1,476,581
AUTOMOBILE TIRE HOLDER
Filed May 23, 1922        2 Sheets-Sheet 1
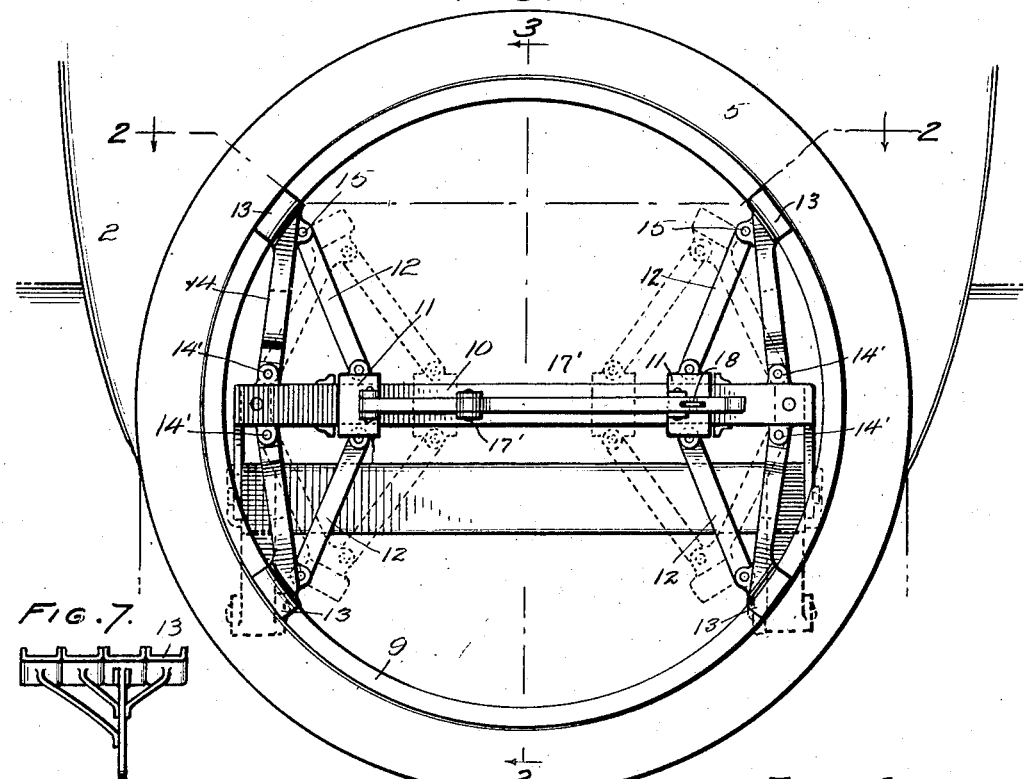
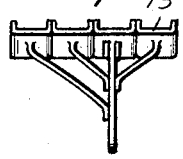
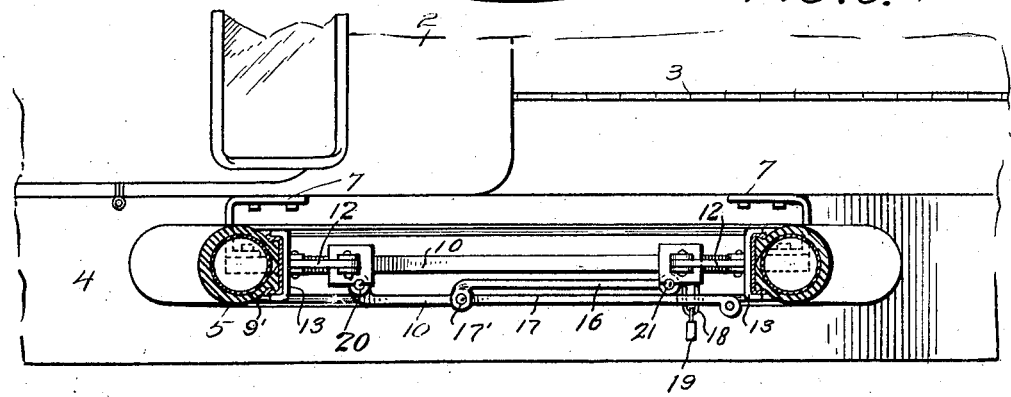
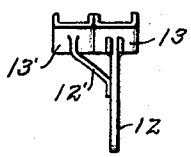
RICHARD C. BAXTER
EDWARD F. GALLOWAY   INVENTORS
HARLEY E. GRAY
BY
*Geo. P. Kimmel*
ATTORNEY.

Dec. 4, 1923.  1,476,581
R. C. BAXTER ET AL
AUTOMOBILE TIRE HOLDER
Filed May 23, 1922    2 Sheets-Sheet 2
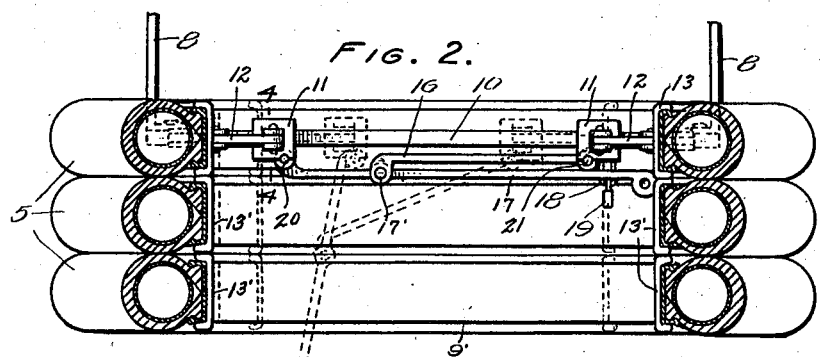
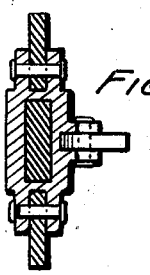
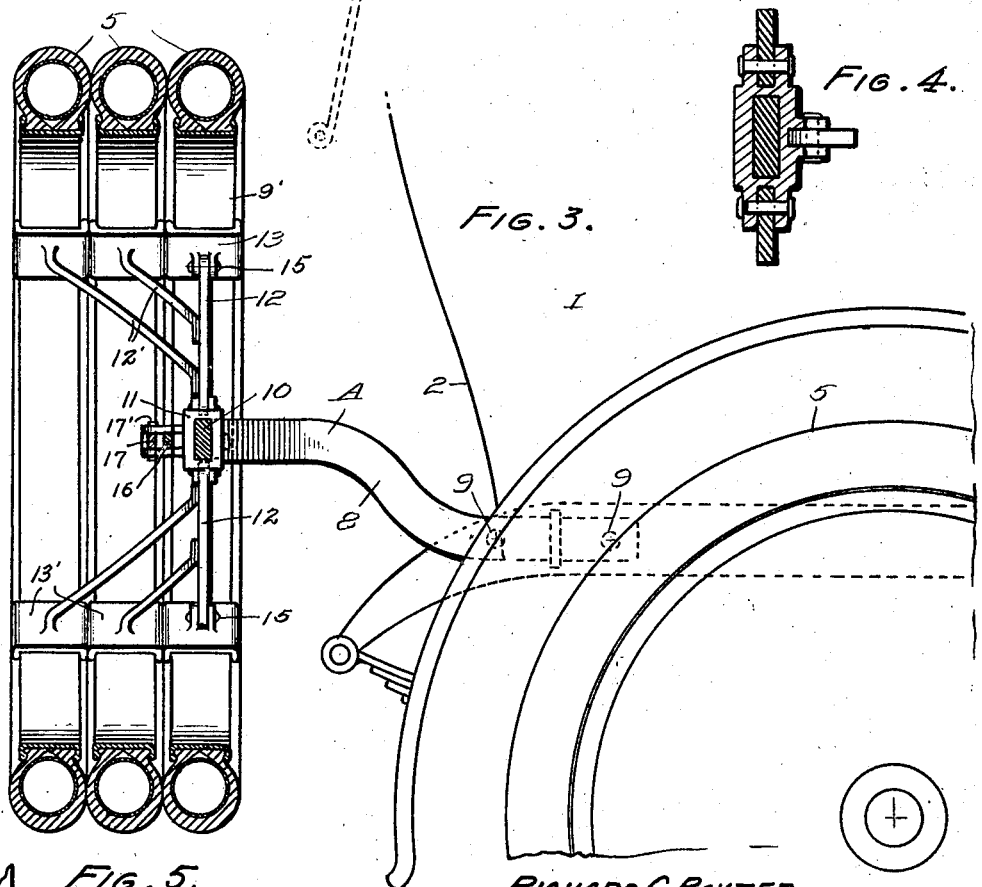
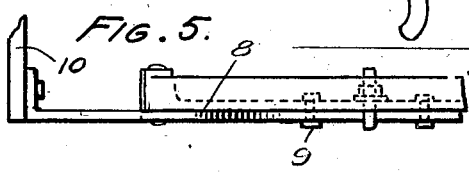
RICHARD C. BAXTER
EDWARD F. GALLOWAY  INVENTORS
HARLEY E. GRAY
BY
ATTORNEY.

Patented Dec. 4, 1923.

1,476,581

UNITED STATES PATENT OFFICE.

RICHARD C. BAXTER, EDWARD F. GALLOWAY, AND HARLEY E. GRAY, OF ATHENS, TENNESSEE, ASSIGNORS OF ONE-FOURTH TO CLEM J. JONES AND ROBERT A. DAVIS, COMPRISING THE FIRM OF JONES & DAVIS, OF ATHENS, TENNESSEE.

AUTOMOBILE TIRE HOLDER.

Application filed May 23, 1922. Serial No. 562,978.

*To all whom it may concern:*

Be it known that we, RICHARD C. BAXTER, EDWARD F. GALLOWAY, and HARLEY E. GRAY, citizens of the United States, residing at Athens, in the county of McMinn and State of Tennessee, have invented certain new and useful Improvements in Automobile Tire Holders, of which the following is a specification.

This invention has reference to improvements in holders for spare automobile tires, whereby the tires are carried upon the running board, rear of the machine or other suitable part of the automobile.

In accordance with the invention, there is provided an expansible and contractible skeleton support which may be introduced into the interior of the holder for the tire rim or rims, to sustain one or more inflated tires on the running board, the rear chassis or other suitable part of the automobile, with the holder so arranged as to sustain the inflated tire or tires, but in such manner that such tire may be easily disconnected without affecting its inflation and permitting the removal of a punctured tire from a wheel sustaining it and the replacing of the punctured tire with one already inflated.

The invention is of such character that an inflated tire or tires each mounted on a rim individual thereto may be carried on the machine and in case of a puncture may be transferred from a holder on the running board or other suitable part of the machine in substitution for an already deflated tire, whereby the necessity of inflating the tire on the road is avoided.

The invention comprises, or may comprise, a plurality of associated members, which together constitute a holder for the tire or tires, with the holders disposed in spaced relation so as to constitute a rigid and at the same time a readily manipulated carrier for the inflated tire or tires without affecting the inflation.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention, as expressed in the appended claims.

In the drawings:—

Figure 1 is a rear elevation of a tire carrier or carriers sustaining one or a plurality of inflated tires and mounted at the rear of the automobile body.

Fig. 2 is a section on the line 2—2 of Fig. 1.

Fig. 3 is a section on the line 3—3 of Fig. 1.

Fig. 4 is a detail section on the line 4—4 of Fig. 2.

Fig. 5 is a view of a detail appearing in Fig. 3.

Fig. 6 is a fragmentary top view, partly in section, showing a carrier for a single tire.

Fig. 7 is a view of a carrier for four tires.

Fig. 8 is a similar view of a carrier for two tires.

Referring to the drawings, there is shown a portion 1 of an automobile, which showing may be considered as typical of many known types of automobiles and consequently requires no specific description.

In the showing of Figs. 1 and 6, there is indicated a vehicle body 2, and one or more tires 5 of any approved type, Fig. 6 also shows a hood 3 and a running board 4.

Fast to the engine casing or hood, in cases where but one spare tire is carried, are spaced brackets 7, each riveted or otherwise attached to the casing 2, or where more than one spare tire is provided as shown in Fig. 3, other brackets 8 are secured in place by rivets or bolts 9 or in any other appropriate manner, to the rear of the body 2.

The brackets 8 are connected together by a cross arm 10 carrying sliding blocks 11 connected by links 12 on opposite sides of the bar 10 to channel brackets 13 each adapted to receive and partially embrace an inflated tire 5.

Any additional number of brackets 13' may be connected to the arms 12 by means of arms 12', for the support of additional tires.

The channel brackets 13 are in number corresponding to the number of spare tires it is desired to mount on the automobile, in some cases but one tire, in some other cases two tires and so on up to four or more tires.

The channel brackets 13, are carried by arms 14, hingedly connected at 14', to the connecting bar 10, the links 12 carried by the sliding blocks 11, are connected to the arms 14, by the hinges 15, the links 12, constituting toggle connections whereby the channel brackets 13, may be made to expand against the rims 9', and support the inflated tires, holding them firmly in place.

The locking means comprises two arms 16 and 17, respectively, hingedly connected as at 17', each arm having one end pivoted at 20 and 21, respectively, to a sliding block 11, to which an arm 14 is pivoted, this structure forming extension toggles by means of which the blocks 11, may be forced apart to bring, through the medium of the links 12, the brackets 13, in contact with the tire carrying rims to retain the same in position.

One of the sliding blocks 11 is provided with a hasp 18 extending through the arm 17 and there receiving a padlock 19 or other locking means.

When a plurality of spare tires is to be carried on the machine, the arms 12 are correspondingly multiplied and are all carried together and fastened by one system of arms 16 and 17 and by a single hasp 18 and lock 19.

The tire carriers and the locking means therefore are all alike whether there be one spare tire or three or four spare tires and the combined locking arms 16 and 17 may be broken for the removal of the tires or extended into locking position as desired.

What is claimed is:—

1. In a tire carrying device, a horizontal supporting bar, oppositely disposed clamping arms pivotally connected at one end to said supporting bar at either end thereof, shiftable block members carried upon the supporting bar, link members pivotally connecting the outer ends of said clamping arms to said block members, and locking means connecting said shiftable block members for locking and releasing the clamping bars.

2. In a tire carrying device, a horizontal supporting bar, oppositely disposed clamping arms pivotally connected at one end to said supporting bar at either end thereof, shiftable block members carried by said supporting bar, link members pivotally connecting the outer ends of said clamping arms to said block members, a locking bar pivoted at one end to one of the block members, and a connecting bar pivoted at one end to the other block member and having its other end pivoted to said locking bar.

3. In a tire carrying device, a horizontal supporting bar, oppositely disposed clamping arms pivotally connected at one end to said supporting bar at either end thereof, channel brackets formed at the outer end of each of said arms, shiftable block members carried upon said bar, link members pivotally connecting the outer ends of said clamping arms to said block members, a staple carried upon the outer face of one of said block members, a locking bar pivoted at one end to one of the block members and provided at its other end with a slot for engaging said staple, and a connecting bar pivoted at one end to the other block member and at its other end to said locking bar.

4. In a tire carrying device, a horizontal supporting bar, oppositely disposed clamping arms pivotally connected at one end to said supporting bar at either end thereof, channel brackets formed at the outer end of each of said arms, shiftable block members carried upon said bar, link members pivotally connecting the outer ends of said clamping arms to said block members, auxiliary arms supported by each of said links, channel brackets formed at the outer end of said auxiliary arms, a staple carried upon the outer face of one of said block members, a locking bar pivoted at one end to one of the block members and provided at its other end with a slot for engaging said staple, and a connecting bar pivoted at one end to the staple carrying block and at the other end to the lock bar intermediate its ends.

In testimony whereof, we affix our signatures hereto.

RICHARD C. BAXTER.
EDWARD F. GALLOWAY.
HARLEY E. GRAY.